Nov. 25, 1930.    G. F. WILSON ET AL    1,782,798
SPREADER DEVICE FOR OPENING VULCANIZING MOLDS OR THE LIKE
Filed Nov. 25, 1927    3 Sheets-Sheet 1

Inventor
George F. Wilson
Harry E. Waner
By Pierson, Eakin & Avery
Attys.

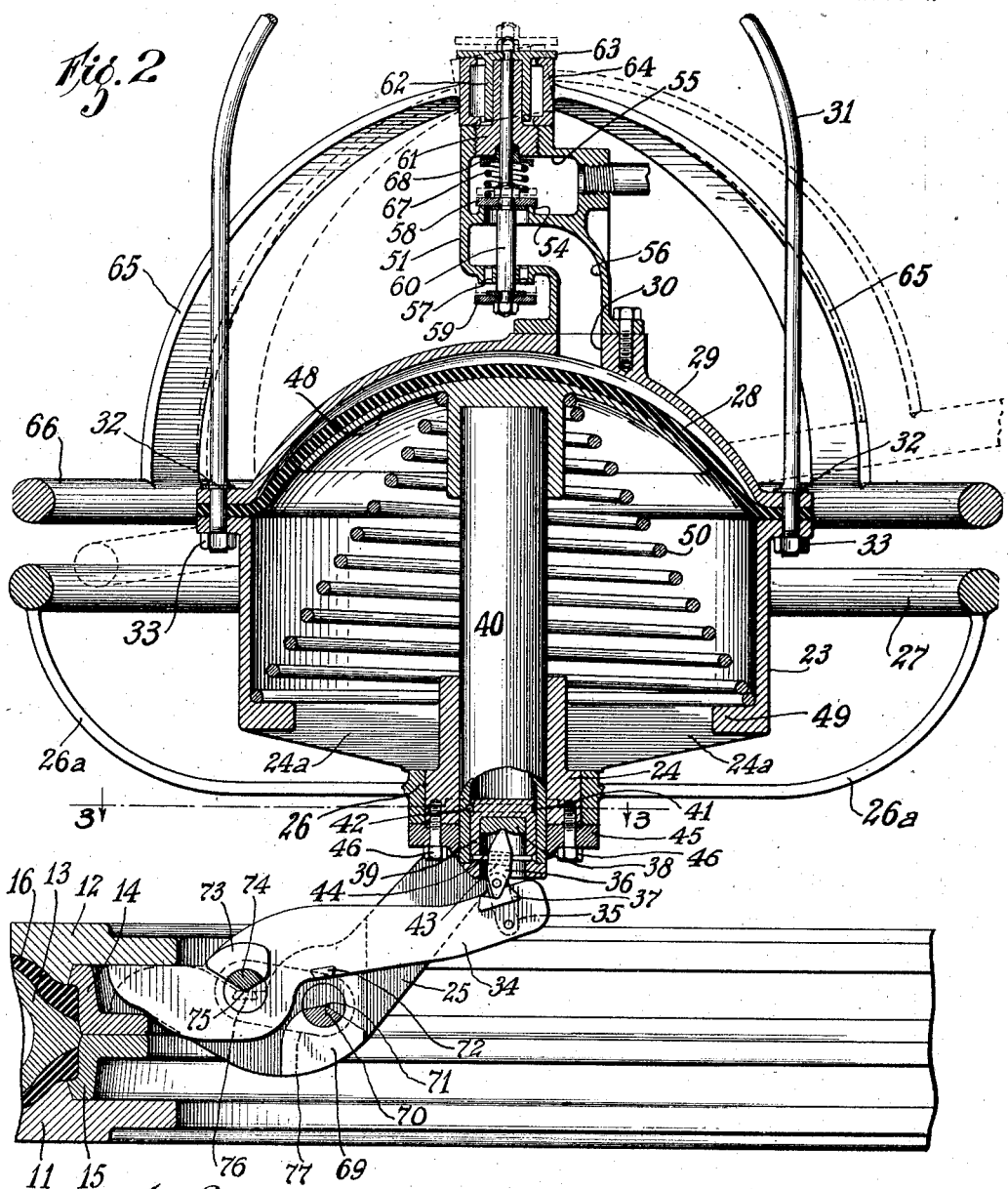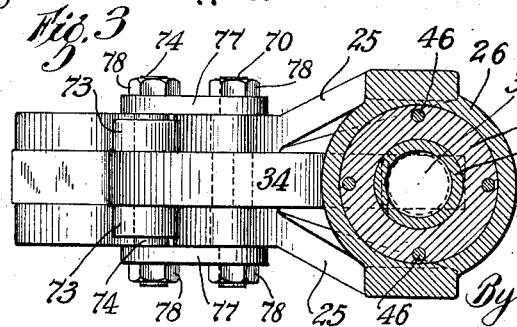

Nov. 25, 1930.  G. F. WILSON ET AL  1,782,798
SPREADER DEVICE FOR OPENING VULCANIZING MOLDS OR THE LIKE
Filed Nov. 25, 1927   3 Sheets-Sheet 3
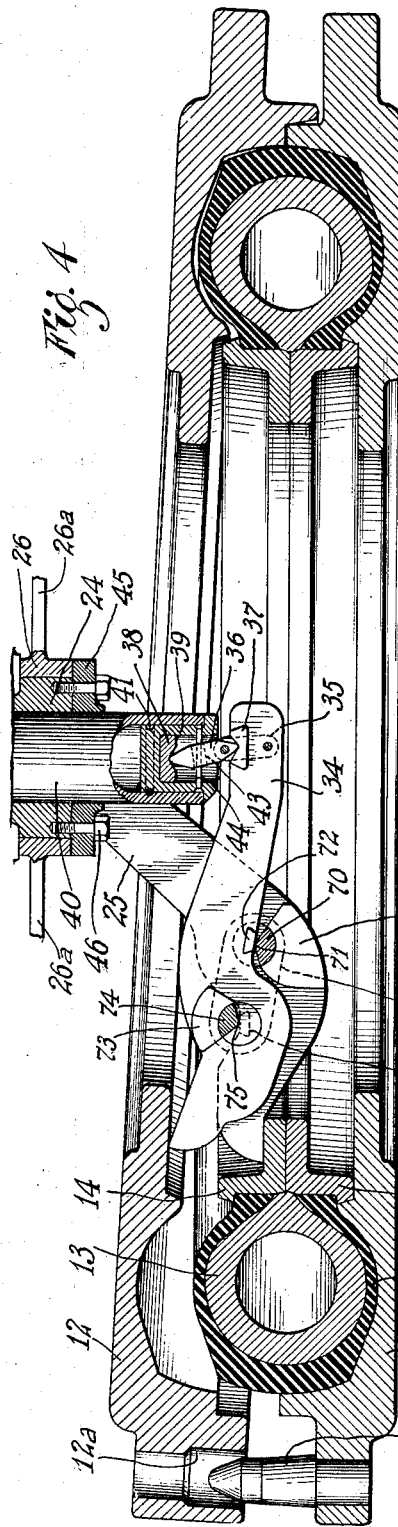
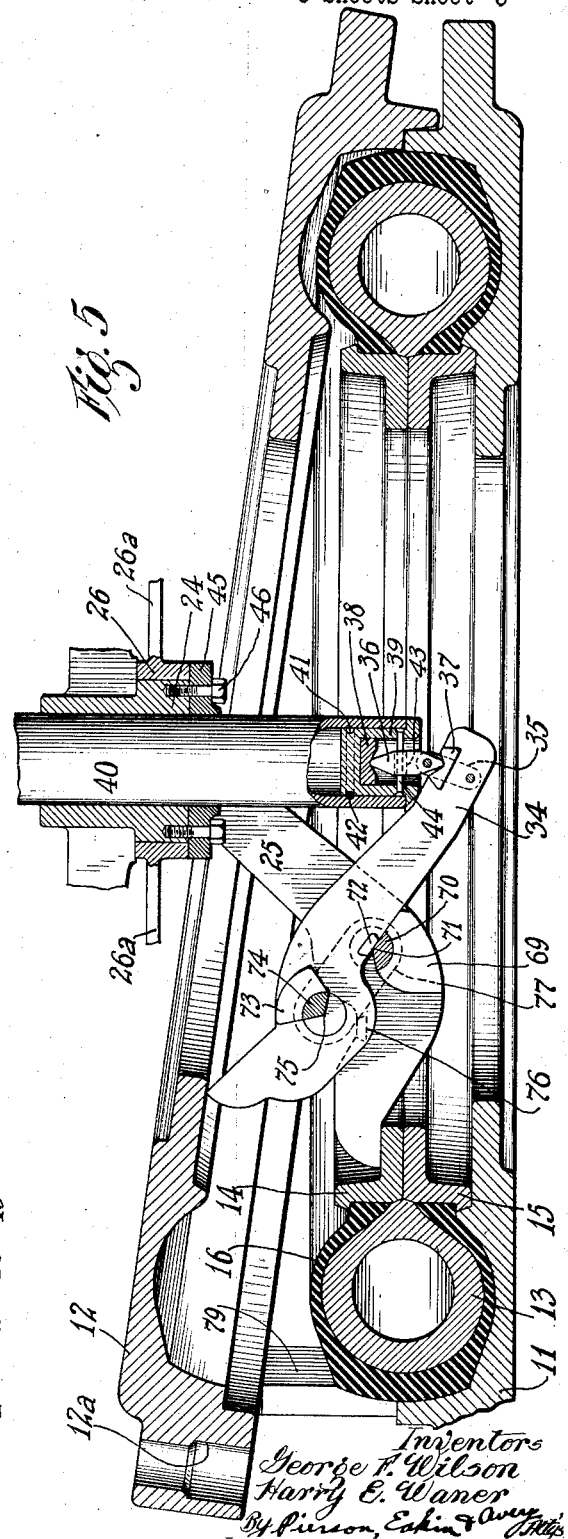

Patented Nov. 25, 1930

1,782,798

UNITED STATES PATENT OFFICE

GEORGE F. WILSON AND HARRY E. WANER, OF AKRON, OHIO, ASSIGNORS TO THE B. F. GOODRICH COMPANY, OF NEW YORK, N. Y., A CORPORATION OF NEW YORK

SPREADER DEVICE FOR OPENING VULCANIZING MOLDS OR THE LIKE

Application filed November 25, 1927. Serial No. 235,446.

This invention relates to devices for forcing apart members such as the sections of molds employed in the vulcanizing of tires, and its chief objects are to provide an improved device for power separation of the mold sections without requiring accurate positioning of the mold; to provide a high mechanical advantage for initiating the separating movement of the mold sections and thereafter a more rapid movement for their further separation; to provide a hand-controlled mold-opening device adapted for easy and quick positioning with relation to the mold; to provide for easy and convenient application of the power while the device is held in mold-opening position; and to provide strength and durability in such a device.

Of the accompanying drawings:

Fig. 2 is a vertical section of the mold-opening device.

Fig. 3 is a section on line 3—3 of Fig. 2.

Fig. 4 is a vertical section of one of the mold assemblies with parts of the mold-opening device in association therewith, the mold sections being shown in a partially opened condition to which they are forced by the device while it operates with a high mechanical advantage.

Fig. 5 is a similar sectional view showing the mold sections as they appear at the end of the more extensive opening movement which is effected rapidly by the device while it operates with less mechanical advantage than that with which it opens the sections to the extent shown in Fig. 4.

Figure 1:
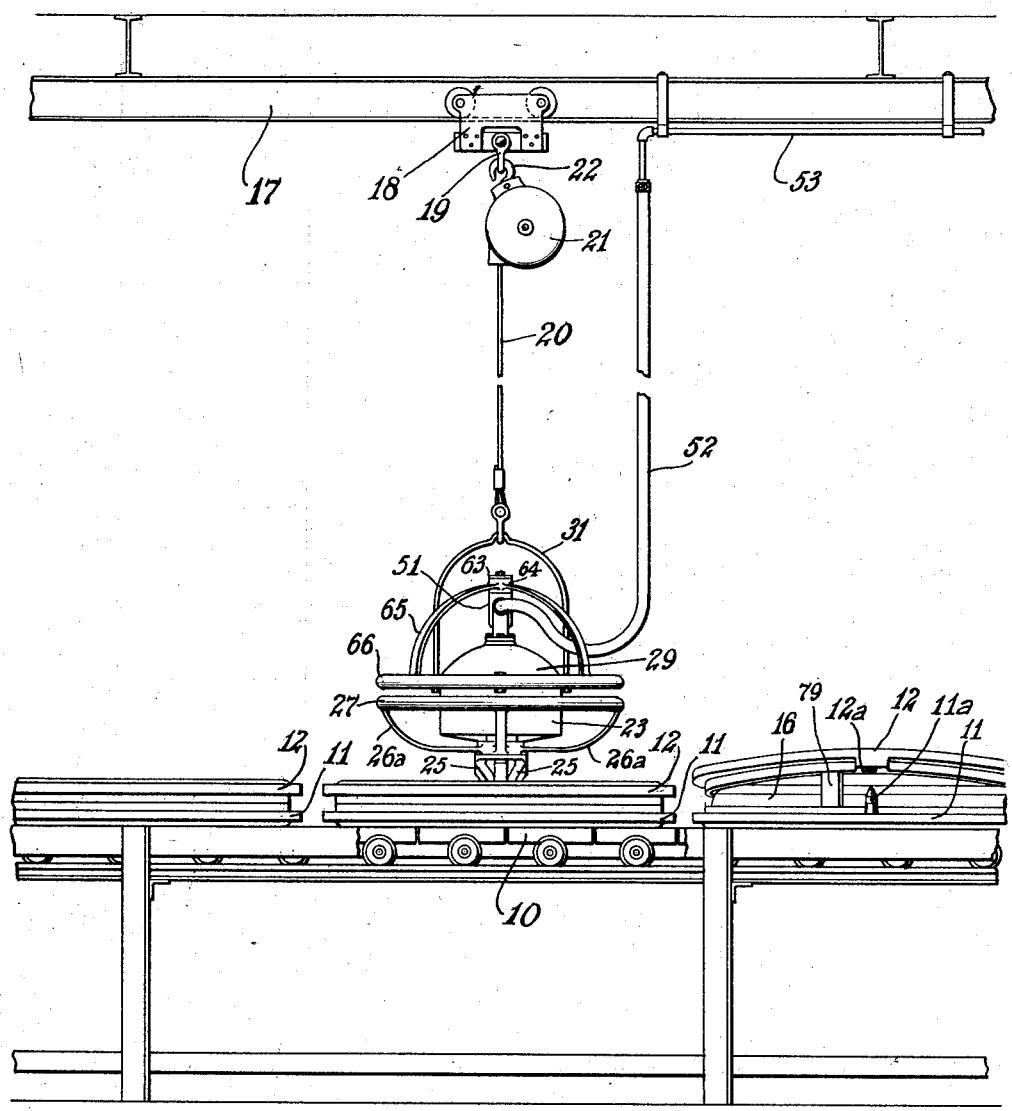
Fig. 1 is an elevation of a tire-mold conveyor with tire molds thereon, an overhead track extending along the conveyor, and a mold-opening device supported from the overhead track and embodying our invention in its preferred form as applied to the opening of tire-molds.

Referring to the drawings, a tire mold conveyor 10 is shown in Fig. 1 having thereon a number of tire-vulcanizing mold assemblies each comprising a lower mold section 11 and an upper mold section 12, the lower mold section being provided with a dowel $11^a$ adapted to enter a dowel aperture $12^a$ in the upper section for accurate registry of the sections. As shown in Figs. 2, 4 and 5 each mold assembly also includes a tire core 13 and a pair of bead-clamping rings 14, 15 which, with the mold sections 11, 12, enclose the tire 16.

Extending along the conveyor 10 is an overhead track 17 (Fig. 1) upon which is mounted a suspension truck 18 provided with a clevis 19, from which our improved mold-opening device is suspended by a cable 20 running from a spring-reel device 21 having a hook 22 engaged in the clevis 19.

The mold-opening device comprises a hollow, drum-like casting 23 formed integrally at its lower end with a central, apertured hub or boss 24 supported by radial spider arms $24^a$, $24^a$. Mounted upon the hub 24 is a ring 26 which is formed with spider-arms $26^a$, $26^a$ extending outwardly and upwardly and supporting a handle-ring 27 formed integrally with the spider arms and surrounding the middle portion of the main body of the casting 23. The ring 26 also is formed with a pair of jaw members 25, 25 projecting obliquely downward and laterally from its respective sides. The ring 26 is secured to the hub 24 by an annular cap-plate 45 which is secured to the lower end of the hub by screw-bolts 46, 46.

The upper end of the casting 23 is closed by a flexible diaphragm 28, preferably of rubber, which has its annular margin clamped between a flange formed on the upper end of the casting 23 and a peripheral flange formed on a dome-like cover-plate 29. The said plate is adapted to limit the upward flexure of the diaphragm 28 and is formed with an inlet passage 30 for admitting pressure-fluid to the upper face of the diaphragm. The flanges of the casting 23 and the cover-plate 29 are clamped together upon the margin of the diaphragm by the end portions of a bail member 31 formed with shoulders 32, 32 co-acting with nuts 33, 33 upon the ends of the bail member to grip the said flanges, the bail member 31 having attachment to the lower end of the cable 20 and supporting the mold-opening device.

Associated with the jaw members 25 and interposed between them is a jaw member 34 having its shank connected by a pair of links such as the link 35 with a roughly diamond-shaped push-block 36 which is interposed between a notched wear-plate 37 mounted in the upper edge of the shank of the jaw member 34 and a notched wear-plate 38 mounted in a flanged, cup-shaped end-fitting 39 which is mounted in the lower end of a vertically reciprocable hollow stem 40. The end-fitting 39 is formed near its upper end with a circumferential groove 41 in which is engaged a retaining pin 42 mounted in the wall of the stem 40, this preferred construction being such that the end-fitting may have rotative movement in the stem 40, although being retained therein, such that the notched wear-plates 37 and 38 and the push-block 36 interposed between them may always find a strong and firm bearing upon each other. To retain the push-block 36 in association with the end-fitting 39 the said block is formed with a transverse aperture 43 through which extends loosely a pin 44 extending across the central cavity of the end-fitting and having its ends mounted in the walls thereof, the aperture 43 being of such size as to permit the necessary angular movement of the block in association with the wear-plates 37 and 38.

The stem 40 is slidably mounted in the central apertures of the cap-plate 45 and the hub 24. Secured upon the upper end of the stem 40 is a dome-shaped head 48 fitting the under side of the diaphragm 28 to act as a backing for the diaphragm to transmit the force of the diaphragm, through the stem 40 and other parts described, to the jaw member 34. Interposed between the head 48 and an internal base flange 49 formed in the lower end of the casting 23 is a compression spring 50 constantly urging the head 48 and associated parts upwardly, to lift the shank of the jaw member 34 when the fluid pressure above the diaphragm is relieved.

For supplying pressure fluid to the upper face of the diaphragm a valve-casing 51 is mounted upon the upper side of the plate 29 with its fluid-delivering passage in communication with the fluid passage 30 of the plate, and is connected with a flexible pipe 52 leading from a compressed-air line 53 which is supported by brackets from the overhead track 17. The casing 51 is formed with a valve-seat 54 between its fluid-receiving chamber 55 and its fluid-delivering passage 56 and with a valve-seat 57 through which pressure-fluid is exhausted from the upper face of the diaphragm 28, the two valve-seats mentioned being aligned and provided with respective closure members or valve-discs 58, 59 mounted upon a valve-stem 60 common to the two, the construction being such that when the valve-disc 58 is in closed position the valve-disc 59 will be in open position and vice versa. The valve-stem 60 is slidably mounted in an apertured guide-plug 61 threaded into a suitable aperture in the top wall of the valve-casing and above the plug 61 the end portion of the valve-stem extends through and is secured in the end wall of a cup-shaped guide member 62, telescoped upon the upper end-portion of the plug 61 and formed with an annular, outwardly projecting flange 63 at its upper end. Loosely surrounding the guide member 62 and interposed between the flange 63 thereof and the upper end of the valve-casing 51 is a hub 64 from which integral spider arms 65, 65 extend outward and downward to a handle-ring 66 formed integrally therewith and spaced a little above the handle-ring 27 hereinabove described, the construction being such that the valve-disc 59 may be seated to shut off the exhaust and the valve-disc 58 concurrently lifted to apply pressure fluid to the diaphragm 28 by tilting the spider structure comprising the handle-ring 66, spider arm 65 and hub 64, and thus causing one or another side of the hub 64 to crowd upward the guide member 62, carrying the valve-stem with it as illustrated by the broken lines in Fig. 2.

For assisting the pressure of the air from the flexible pipe 52 to close the valve-disc 58 and open the valve-disc 59 when the handle-ring 66 is released, a compression spring 67 is interposed between the disc 58 and a flanged packing-retainer 68 mounted in the lower end of the plug 61. The structure as described is such that an operator grasping any part of the handle-ring 66 may conveniently charge and vent the space between the diaphragm 28 and the plate 29 and thus cause the jaw member 34 to be turned with relation to the jaw members 25.

Each of the two jaw members 25 is formed on its inner face with an upwardly facing fulcrum boss 69 relatively near the main body of the ring 26, and at the position of these bosses a hardened bolt 70 extends through the two jaw members and is formed on its upper side, over the bosses, with plane faces meeting at an angle, to provide a fulcrum-edge 71 at the axis of the bolt and adapted to coact with a wear-plate 72 inset in the lower edge of the jaw member 34.

At a position farther from the body portion of the ring 26, which is to say nearer the work-engaging portions of the jaw members, the jaw member 34 is formed on each side face with a fulcrum boss 73, and a hardened bolt 74 extends transversely through the jaw member and under each of the bosses 73 and is formed with downwardly facing fulcrum edges 75 at the axis of the bolt adapted to coact with respective wear-plates 76 inset in the edge of the adjacent jaw members 25. Preferably the bolt 70 is secured against rotation in the jaw members 25 and the bolt 74 is secured against rotation in the jaw member 34 to keep their fulcrum edges properly facing the wear-plates with which they coact.

At each side of the jaw assembly a link 77 is rotatably mounted upon the adjacent ends of the bolts 70 and 74 and retained thereon by nuts 78, 78 so that in the mold-opening relative movement of the jaw members 34 and 25 the jaw members will be held in proper relation while first operating upon the fulcrum of the bolt 74 in contact with the wear-plates 76, with high mechanical advantage, until the wear-plate 72 engages the bolt 70, the jaws then operating upon the fulcrum of the bolt 70 in contact with the said wear-plate, for a more rapid movement and a wider range of movement of the forward, mold-engaging extremities of the jaw members, and the links 77 turning about the fulcrum edge 71 of the bolt, at the axis thereof.

In the operation of the device, the handle-ring 66 resting in parallel relation to the handle-ring 27 and the space over the diaphragm 28 consequently being vented and the shank of the jaw member 34 being lifted, the device is so manipulated by means of the handle-ring 27 as to insert the forward ends of the jaw members between the upper section 12 and the upper bead-clamping ring 14 of a mold assembly at the inner periphery thereof and preferably at approximately the circumferential position of the dowel 11$^a$, to avoid cramping of the dowel. By reason of the suspension of the device from the spring reel 21 the device readily may be brought to the proper elevation for the mold-opening operation, and the provision of the complete annular handle-rings 27 and 26 permits the device to be turned on a vertical axis to the desired position with relation to the mold assembly and its dowel 11$^a$, the valve-actuating ring 66 being adapted to be readily grasped by the operator at any position about the device to operate the valves.

The device having been positioned in association with the mold assembly as described, the operator forces toward the ring 27 such part of the ring 66 as may most readily be grasped and thereby charges the space over the diaphragm 28 with compressed air, which forces downward the stem 40 and the shank of the jaw member 34.

In this power movement of the jaw member 34 the jaw first fulcrums at 75, forcing the mold sections apart with a high mechanical advantage, until the wear-plate 72 contacts the bolt 70, as shown in Fig. 4, whereupon the further downward movement of the stem 40 causes the jaws to fulcrum at 71 and further open the mold, to the position shown in Fig. 5, with a comparatively rapid action. When the mold has thus been opened its sections may be propped apart by means of a prop block 79, as shown in Fig. 5. The handle-ring 66 is then released and is swung back into parallel relation with the handle-ring 27 by the force of the air pressure in the chamber 55 of the valve casing and the force of the compression spring 67, which shuts off the supply of air and unseats the valve-disc 59 to vent the device so that the stem 40 is lifted by the spring 50 and the jaw members are returned to their initial relative positions. The device is then withdrawn from the mold assembly and is ready for a repetition of the operation as described.

Our invention provides the several advantages set out in the above description and particularly those referred to in the above statement of objects and as it may be modified without sacrifice of all of these advantages we do not wholly limit our claims to the specific construction herein described.

We claim:

1. Apparatus of the character described comprising a pair of jaw members, coacting fulcrum means on the two jaw members having their fulcrum axis relatively close to the work-engaging portions of the jaw members for high mechanical advantage and coacting fulcrum means on the two jaw members having their fulcrum axis farther from the said work-engaging portions for actuating the latter at relatively high speed and with a relatively wide range.

2. A spreader comprising a pair of spreader-jaw members and fulcrum means thereon so constructed and arranged as to give a shifting of the fulcrum axis with relation to both of the members as the said members are relatively turned to spread apart their work-engaging portions.

3. Apparatus of the character described comprising a pair of spreader jaw members associated for pivoted coaction as levers of the first order and a fluid-pressure device connecting said members for actuating the same.

4. Apparatus of the character described comprising a pair of spreader jaw members associated for pivotal coaction as levers of the first order and a fluid-pressure device connecting said members for actuating the same, the said jaw members and the said fluid-pressure device being freely movable as a unit.

5. A device as defined in claim 4 including a valve mounted upon the fluid-pressure device for controlling the latter and valve-actuating means including handle means at substantially all positions about the device.

6. Apparatus of the character described comprising a fluid-pressure device having two relatively-moving, power-actuated elements, yielding means for suspending the device from an overhead support, and a pair of pivotally coacting spreader jaw members arranged as levers of the first order having operative connection respectively to the two relatively-moving, power actuated elements of the fluid-pressure device.

7. A spreader comprising a pair of jaw members, two pairs of fulcrum means thereon at different distances from the work-engaging portions of said members, and a link member pivoted to one of said members at one of the fulcrum axes and to the other of said members at the other fulcrum axis.

8. A spreader as defined in claim 7 including power means for turning one of the jaw members with relation to the other.

In witness whereof we have hereunto set our hands this 22nd day of November, 1927.

GEORGE F. WILSON.
HARRY E. WANER.